April 16, 1935.  C. L. GILSTRAP ET AL  1,998,314
WEED PULLER AND REMOVER
Original Filed Nov. 19, 1932
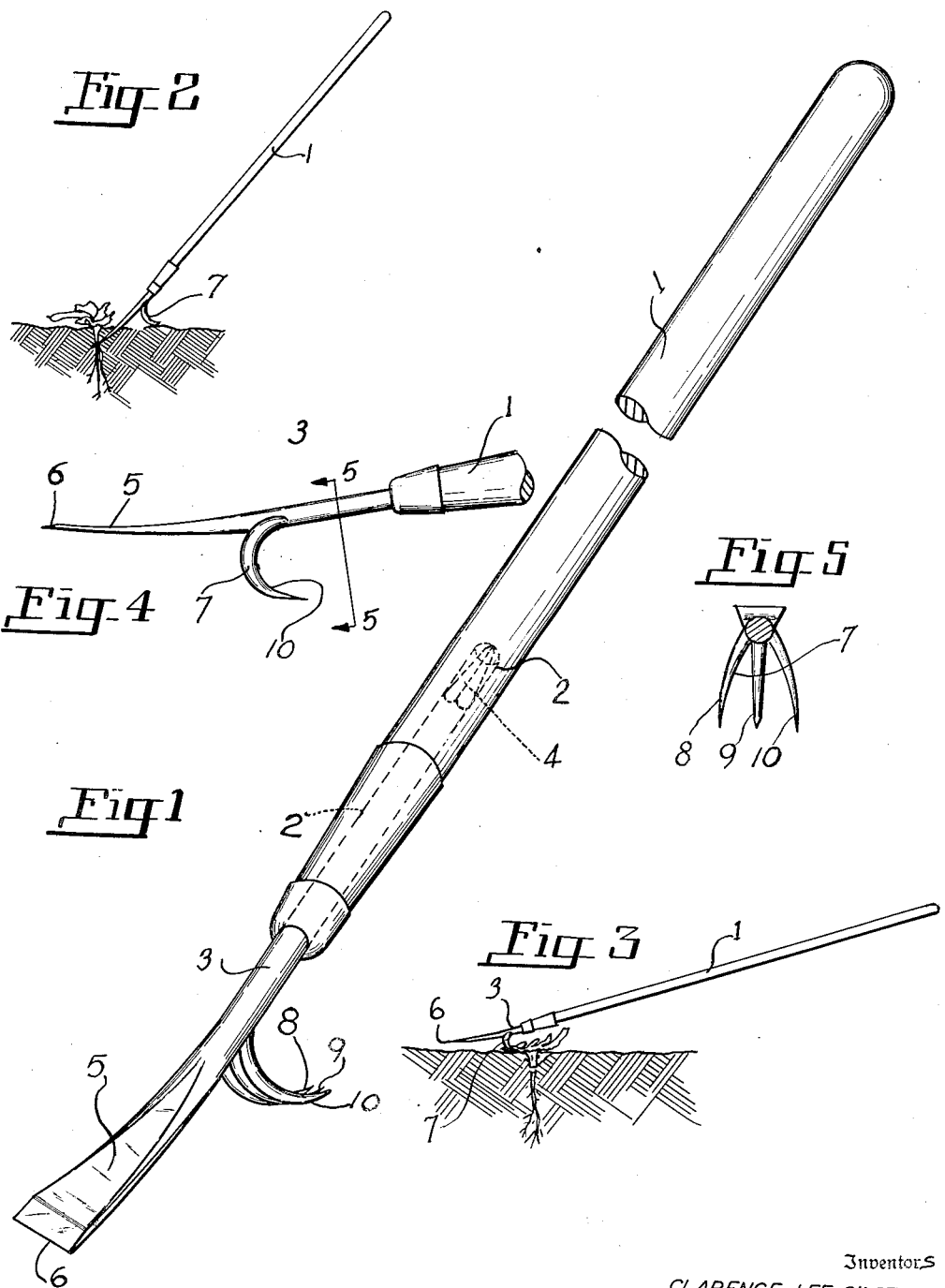
Inventors
CLARENCE LEE GILSTRAP
HIRAM TRIMBLE SMITH
By
Attorney Patented Apr. 16, 1935

1,998,314

UNITED STATES PATENT OFFICE 1,998,314

WEED PULLER AND REMOVER

Clarence Lee Gilstrap and Hiram Trimble Smith,
La Grande, Oreg.

Application November 19, 1932, Serial No. 643,436
Renewed January 30, 1935

1 Claim. (Cl. 254—132)

This invention has for its primary purpose and object the cutting of the root structure of the weed and the removal of the same by the rake from the supporting ground. The device is comprised of a one piece body element to which is attached a handle member.

This invention is directed to garden tools more especially to a weed cutter and puller.

It has for its principal object to provide a device of this character formed of a single piece of material and wherein is combined a cutting tool and a raking tool.

With these and incidental objects in view, the invention consists in certain novel features of construction and combination of parts, the essential elements of which are set forth in the appended claim, and a preferred form of embodiment of which is hereinafter shown with reference to the drawing which accompanies and forms a part of this specification.

In the drawing:

Fig. 1 is a perspective front end view of the device shown in permanent engagement with a handle.

Fig. 2 is a side view of the device illustrating the same as used for cutting the vegetation below the ground.

Fig. 3 is a side view of the device illustrating the rake portion of the same in operative engagement with a weed, and showing the removing operation thereof.

Fig. 4 is a fragmentary side view of the device.

Fig. 5 is a sectional, end view of the assembled device, taken on line 5—5 of Fig. 4, looking in the direction indicated.

Like reference characters refer to like parts throughout the several views.

Reference numeral 1, indicates an elongated handle of any approved type, such as is commonly used in garden tools. One end of the handle is longitudinally bored, as at 2, to snugly embrace by driving fit, one end of the main body member 3 of our improved form of tool. This end of the tool is suitably pointed, as at 4, for ease of insertion into the bore 2. The opposite end of the main body 3 is flattened, as at 5, and formed into a cutting edge 6. Integrally formed with the main body member 3 and depending downwardly therefrom and slightly rearward with respect thereto is a rake portion generally indicated at 7 and formed with a plurality of prongs 8, 9 and 10.

In dealing with a weed, or its root, or any other objectional vegetation to be removed from the ground the tool by means of its handle is thrust downwardly in an angular path with respect to the body of the root in such manner that the cutting edge 6 of the tool will cut completely through the root at a point below the surface of the ground, and below the crown of the weed to be destroyed and removed, leaving the upper portion of the weed, that has been thus severed, free to be removed, whereupon the rake portion 7 is drawn into engagement with the weed to further its removal.

In most cases the upper, or severed portion of the weed is easily removed but in some cases where the said upper portion tends to cling to the earth surrounding it, or perhaps due to the fact that the body of the root was not completely severed by the cutting thrust of the edge 6, then a prying force may be exerted upon the root by positioning the handle of the tool approximately, as shown in Fig. 3. Then as the cutting edge contacts the surface of the ground it forms a pivot point for the upward swing of the tool as a whole and thereby facilitating complete removal of the weed, root, or the like.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What we claim is:

A tool of the class described, comprising an elongated solid shank pointed at one of its ends and slightly curved upwardly at its opposite end, said curved end terminating in a flattened knife-edge, a raking element formed on the underside of the shank and turned rearwardly with respect thereto, said raking element comprising a plurality of teeth spaced apart at their lowermost ends and united at their upper ends with said shank.

CLARENCE LEE GILSTRAP.
HIRAM TRIMBLE SMITH.